(12) United States Patent
Bastide et al.

(10) Patent No.: US 9,886,480 B2
(45) Date of Patent: Feb. 6, 2018

(54) MANAGING CREDIBILITY FOR A QUESTION ANSWERING SYSTEM

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US); Fang Lu, Billerica, MA (US)

(73) Assignee: International Business Machines Corporation, Armonk, NY (US)

(*) Notice: Subject to any disclaimer, the term of this patent is extended or adjusted under 35 U.S.C. 154(b) by 376 days.

(21) Appl. No.: 14/478,061

(22) Filed: Sep. 5, 2014

(65) Prior Publication Data

US 2016/0034565 A1 Feb. 4, 2016

Related U.S. Application Data

(63) Continuation of application No. 14/445,182, filed on Jul. 29, 2014.

(51) Int. Cl.
G06F 17/30 (2006.01)
G06F 7/00 (2006.01)
H04L 29/08 (2006.01)

(52) U.S. Cl.
CPC .... *G06F 17/3043* (2013.01); *G06F 17/30675* (2013.01); *G06F 17/30684* (2013.01);
(Continued)

(58) Field of Classification Search
None
See application file for complete search history.

(56) References Cited

U.S. PATENT DOCUMENTS 7,676,464 B2 3/2010 Laker et al.
7,844,592 B2 11/2010 Shoval et al.
(Continued)

FOREIGN PATENT DOCUMENTS

WO 2013125286 A1 8/2013

OTHER PUBLICATIONS

Bastide, P., et al. "Managing Credibility for a Question Answering System", U.S. Appl. No. 14/445,182, filed Jul. 29, 2014.
(Continued)

*Primary Examiner* — Jeffrey A Burke
(74) *Attorney, Agent, or Firm* — Nathan M. Rau

(57) ABSTRACT

A method and system for managing credibility of a set of search results for a search query is disclosed. The method can include determining, by a natural language processing technique configured to analyze a portion of the set of search results and a portion of the search query, a credibility factor configured to indicate similarity to a subject matter of the search query. The method can also include establishing a relevance relationship between the credibility factor and source information of a first search result of the set of search results, wherein the source information is based on the credibility factor. The method may also include computing a credibility score for the first search result of the set of search results based on the relevance relationship between the credibility factor and the source information of the set of search results.

1 Claim, 8 Drawing Sheets

(52) U.S. Cl.
CPC .. *G06F 17/30861* (2013.01); *G06F 17/30864* (2013.01); *H04L 67/02* (2013.01)

(56) References Cited

U.S. PATENT DOCUMENTS

| | | | | |
|---|---|---|---|---|
| 8,126,882 | B2* | 2/2012 | Lawyer | G06Q 10/063 705/7.11 |
| 8,280,882 | B2* | 10/2012 | Troy | G06F 17/3069 707/723 |
| 8,290,924 | B2 | 10/2012 | Rajaram | |
| 8,312,021 | B2* | 11/2012 | Matveeva | G06F 17/2715 707/739 |
| 8,346,701 | B2* | 1/2013 | Wang | G06F 17/30634 706/46 |
| 8,458,196 | B1* | 6/2013 | Procopio | G06F 17/30705 707/749 |
| 8,468,153 | B2* | 6/2013 | Truve | H04W 4/20 707/723 |
| 8,601,030 | B2 | 12/2013 | Bagchi et al. | |
| 8,775,437 | B2* | 7/2014 | Weitz | G06F 17/30864 707/748 |
| 8,924,419 | B2* | 12/2014 | Koister | G06Q 50/01 707/771 |
| 2006/0106784 | A1 | 5/2006 | Alpha | |
| 2009/0157490 | A1* | 6/2009 | Lawyer | G06Q 10/063 705/59 |
| 2009/0276429 | A1 | 11/2009 | Curtiss et al. | |
| 2009/0319342 | A1* | 12/2009 | Shilman | G06F 17/30864 705/7.41 |
| 2010/0299324 | A1* | 11/2010 | Truve | H04W 4/20 707/725 |
| 2011/0060733 | A1* | 3/2011 | Peng | G06F 17/30867 707/723 |
| 2011/0246456 | A1* | 10/2011 | Weitz | G06F 17/30864 707/724 |
| 2011/0264656 | A1* | 10/2011 | Dumais | G06F 17/3087 707/728 |
| 2012/0296918 | A1* | 11/2012 | Morris | G06F 17/30657 707/748 |
| 2013/0218644 | A1* | 8/2013 | Kasravi | G06Q 10/06 705/7.39 |
| 2013/0262501 | A1 | 10/2013 | Kuchmann-Beauger et al. | |
| 2013/0288219 | A1 | 10/2013 | Dheap et al. | |
| 2014/0019443 | A1* | 1/2014 | Golshan | G06F 17/30867 707/723 |
| 2014/0023348 | A1 | 1/2014 | O'Kelly et al. | |
| 2015/0019565 | A1* | 1/2015 | Lijachev | G06F 17/3053 707/748 |
| 2015/0032492 | A1* | 1/2015 | Ting | G06Q 50/01 705/7.14 |
| 2015/0293976 | A1* | 10/2015 | Guo | G06F 17/30554 707/706 |
| 2015/0370797 | A1* | 12/2015 | Mishra | H04L 51/046 707/748 |

OTHER PUBLICATIONS

List of IBM Patents or Patent Applications Treated as Related.

* cited by examiner

MANAGING CREDIBILITY FOR A QUESTION ANSWERING SYSTEM

BACKGROUND

Aspects of the present disclosure relate to various embodiments of a system and method for a computer-implemented question answering system. More particular aspects relate to managing document credibility.

The amount of data and information available on the internet and other communication networks is growing rapidly. Question answering systems are one tool by which a user may find desired information. As the amount of available information increases, the use of question answering systems may also increase. As the use of question answering systems increases, the need for management of QA systems may also increase.

SUMMARY

Aspects of the present disclosure, in certain embodiments, are directed toward a system and method for managing credibility of a set of search results for a search query in a question answering system. In certain embodiments, the method may include determining, by a natural language processing technique configured to analyze at least a portion of the set of search results and at least a portion of the search query, at least one credibility factor to configured to indicate similarity to a subject matter of the search query. In certain embodiments, the method may include establishing a relevance relationship between the at least one credibility factor and source information of a first search result of the set of search results, wherein the source information is based on the at least one credibility factor. In certain embodiments, the method may include computing a credibility score for the first search result of the set of search results based on the relevance relationship between the at least one credibility factor and the source information of the set of search results.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
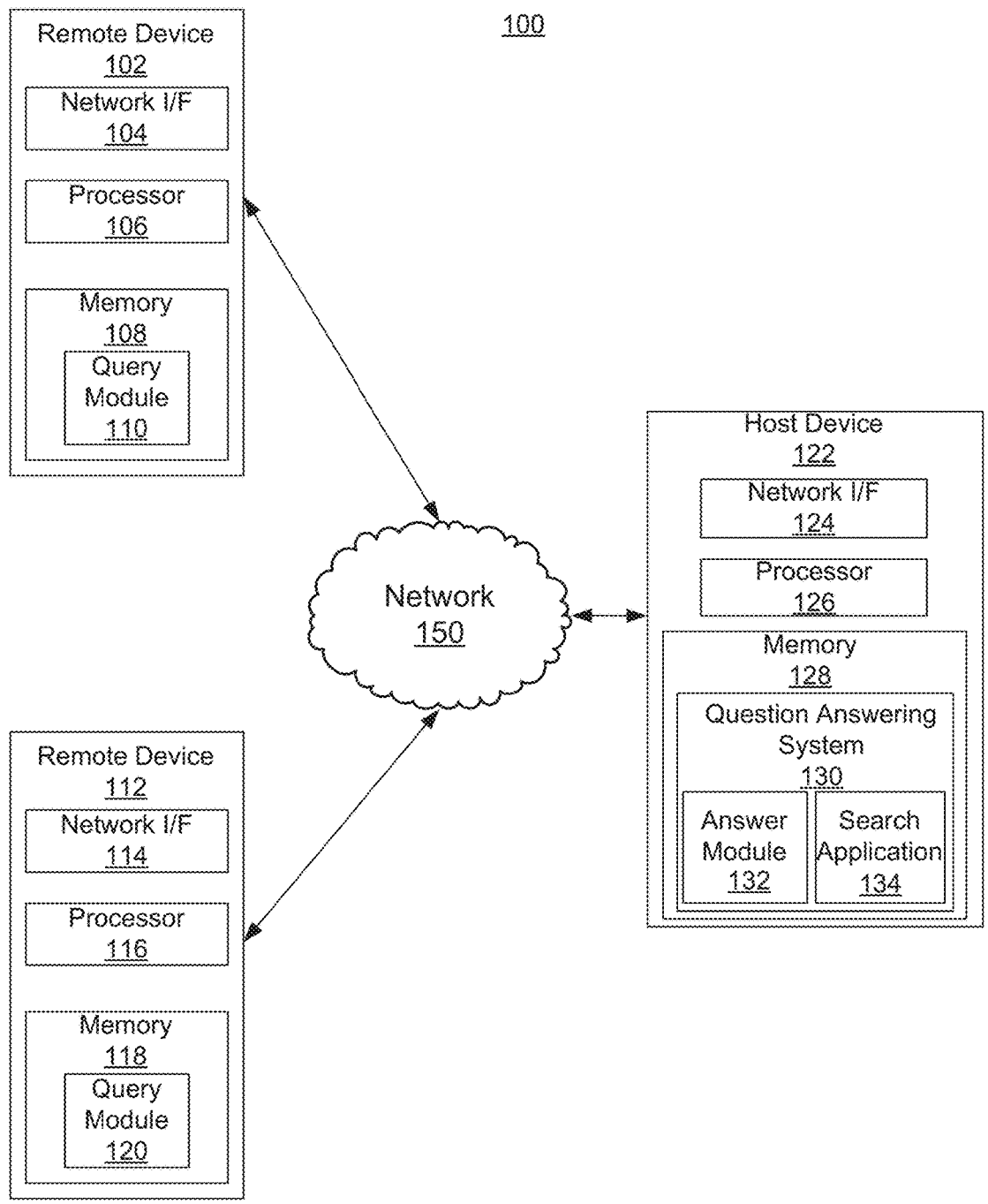
FIG. 1 is a diagrammatic illustration of an exemplary computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments of a system and method for a computer-implemented question answering system. More particular aspects relate to managing credibility of a set of search results for a search query in the question answering system. The method may include determining, by a natural language processing technique configured to analyze at least a portion of the set of search results and at least a portion of the search query, at least one credibility factor configured to indicate similarity to a subject matter of the search query. The method may also include establishing a relevance relationship between source information of a first search result of the set of search results and the at least one credibility factor, wherein the source information is based on the at least one credibility factor. The method can also include computing a credibility score for the first search result of the set of search results based on the relevance relationship between the at least one credibility factor and the source feature of the set of search results.

As the amount of information available over computer networks, such as the Internet, rapidly increases, question answering systems have become an important tool in assisting users with the gathering, searching, and analysis of data. However, aspects of the present disclosure relate to the recognition that, in certain situations, the results provided to a user in response to an input question may have various levels of credibility. Often, a user must sift through each search result and manually evaluate the credibility of each one. This process may be time consuming, and may potentially leave the most credible search result unread. Accordingly, aspects of the present disclosure relate to a system and method for evaluating the credibility of a set of search results provided in response to a search query. More particularly, the present disclosure may identify one or more credibility factors based on the search query and the search results, and evaluate the credibility of search results based on a correlation between the credibility factors and specific source information of the search results. The present disclosure may provide benefits associated with increased search efficiency, saving a user the time of performing multiple searches, and increased search result credibility.

Aspects of the present disclosure relate to various embodiments of a system and method for a computer-implemented question answering system. More particular aspects relate to managing credibility of a set of search results for a search query in the question answering system. The method and system may work on a number of devices and operating systems. Aspects of the present disclosure include determining at least one credibility factor configured to indicate similarity to a subject matter of the search query. The determining may be performed by a natural language processing technique configured to analyze at least a portion of the set of search results and at least a portion of the search query. Aspects of the present disclosure also include establishing a relevance relationship between source information of a first search result of the set of search results and the at least one credibility factor, wherein the source information is based on the at least one credibility factor. As an example, the source information may include an origin location feature, a chronology feature, or a milestone feature.

In certain embodiments, determining the one or more credibility factors further includes parsing, by the natural language processing technique, a portion of the set of search results and a portion of the search query to determine a semantic feature and a syntactic feature. The semantic feature may at least in part be associated with word meaning, and the syntactic feature may at least in part be associated with part-of-speech. In certain embodiments, establishing the relevance relationship between source information of the first search result of the set of search results and the at least one credibility factor further comprises comparing metadata associated with the source information to metadata coupled with the subject matter of the query. Aspects of the present disclosure may also include computing a credibility score for the first search result of the set of search results based on the relevance relationship between the at least one credibility factor and the source feature of the set of search results.

In certain embodiments of the present disclosure, determining the at least one credibility factor may include identifying, by the natural language processing technique, an origin location feature of the search query. The origin location feature may, for example, be a geographic region. Further, establishing a relevance relationship between the source information of the first search result of the set of search results and the at least one credibility factor includes extracting a correlation between an author feature from the first search result of the set of search results and the origin location feature of the search query. The author feature may, for example, include a nationality, a cultural expertise, a subject area expertise, or a first language. Additionally, computing the credibility score for the first search result of the set of search results may be based on the correlation between the origin location feature of the search query and the author feature of the first search result.

In certain embodiments of the present disclosure, determining the at least one credibility factor may include identifying, by the natural language processing technique, a first chronology feature of the search query. The first chronology feature may, for example, be a date or version number. Further, establishing a relevance relationship between the source information of the first search result of the set of search results and the at least one credibility factor includes extracting a correlation between a second chronology feature from the first search result of the set of search results and the first chronology feature of the search query. Extracting the correlation between the first chronology feature of the search query and the second chronology feature of the first search result may further include determining that a recency score of the second chronology feature is within a recency range associated with the first chronology feature. In certain embodiments, computing the credibility score for the first search result of the set of search results is based on the correlation between the first chronology feature of the search query and the second chronology feature of the first search result.

In certain embodiments of the present disclosure, determining the at least one credibility factor further includes identifying, by the natural language processing technique, a first subject matter of the search query. Further, establishing the relevance relationship between the source information of the first search result of the set of search results and the at least one credibility factor includes extracting a correlation between a set of subject matter milestones from the first search result of the set of search results and the first subject matter of the search query. Additionally, computing the credibility score for the first search result of the set of search results is based on the correlation between the subject matter of the search query and the set of subject matter milestones of the first search result. In certain embodiments, the method can also include determining that a time frame value of the set of subject matter milestones is within a time frame value range. In certain embodiments, the method can include generating, based on the time frame value of the set of subject matter milestones, a cluster graph to represent the correlation between the subject matter and the set of subject matter milestones.

Turning now to the figures, FIG. 1 is a diagrammatic illustration of an exemplary computing environment, consistent with embodiments of the present disclosure. In certain embodiments, the environment 100 can include one or more remote devices 102, 112 and one or more host devices 122. Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In certain embodiments the network 100 can be implemented by any number of any suitable communications media (e.g., wide area network (WAN), local area network (LAN), Internet, Intranet, etc.). Alternatively, remote devices 102, 112 and host devices 122 may be local to each other, and communicate via any appropriate local communication medium (e.g., local area network (LAN), hardwire, wireless link, Intranet, etc.). In certain embodiments, the network 100 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

In certain embodiments, host device 122 can include a question answering system 130 (also referred to herein as a QA system) having a search application 134 and an answer module 132. In certain embodiments, the search application may be implemented by a conventional or other search engine, and may be distributed across multiple computer systems. The search application 134 can be configured to search one or more databases or other computer systems for content that is related to a question input by a user at a remote device 102, 112.

In certain embodiments, remote devices 102, 112 enable users to submit questions (e.g., search requests or other queries) to host devices 122 to retrieve search results. For example, the remote devices 102, 112 may include a query module 110 (e.g., in the form of a web browser or any other suitable software module) and present a graphical user (e.g., GUI, etc.) or other interface (e.g., command line prompts, menu screens, etc.) to solicit queries from users for submission to one or more host devices 122 and further to display answers/results obtained from the host devices 122 in relation to such queries.

Consistent with various embodiments, host device 122 and remote devices 102, 112 may be computer systems preferably equipped with a display or monitor. In certain embodiments, the computer systems may include at least one processor 106, 116, 126 memories 108, 118, 128 and/or internal or external network interface or communications devices 104, 114, 124 (e.g., modem, network cards, etc.), optional input devices (e.g., a keyboard, mouse, or other input device), and any commercially available and custom software (e.g., browser software, communications software, server software, natural language processing software, search engine and/or web crawling software, filter modules for filtering content based upon predefined criteria, etc.). In certain embodiments, the computer systems may include server, desktop, laptop, and hand-held devices. In addition, the answer module 132 may include one or more modules or units to perform the various functions of present disclosure embodiments described below (e.g., determining credibility factors, establishing a relevance relationship between source information of a first search result and at least one credibility factor, computing a credibility score for the first search result, etc.), and may be implemented by any combination of any quantity of software and/or hardware modules or units.

Figure 2:
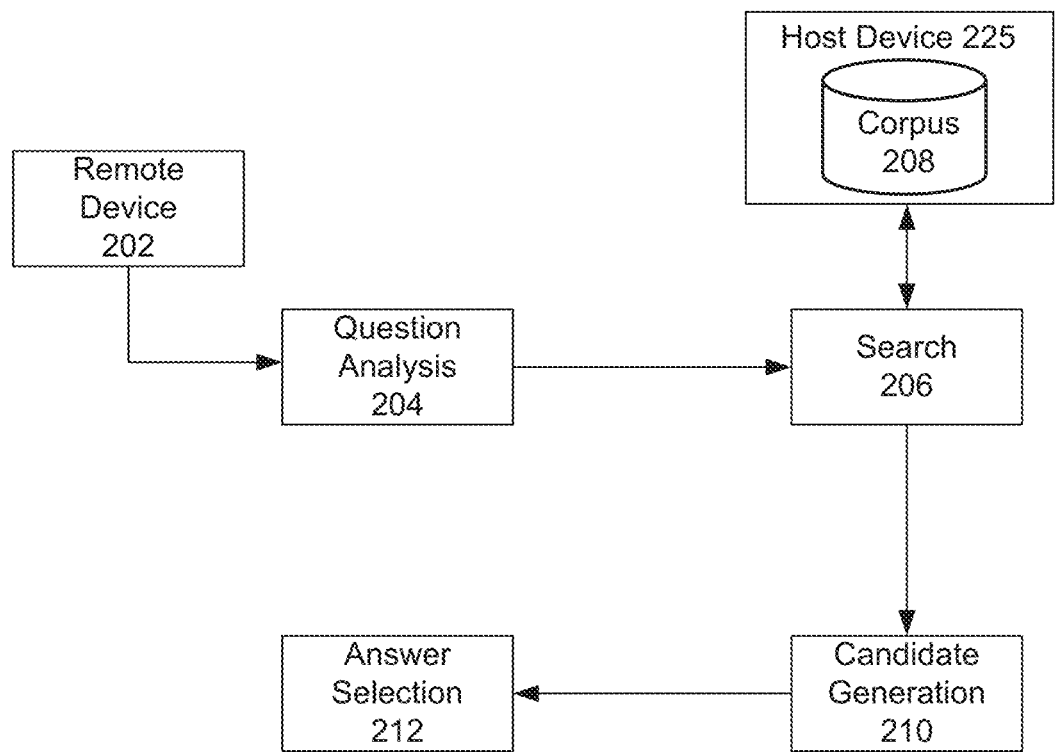
FIG. 2 is a system diagram depicting a high level logical architecture for a question answering system, according to embodiments.

FIG. 2 is a system diagram depicting a high level logical architecture for a question answering system (also referred to herein as a QA system), consistent with embodiments of the present disclosure. Aspects of FIG. 2 are directed toward components for use with a QA system. In certain embodiments, the question analysis component 204 can receive a natural language question from a remote device 202, and can analyze the question to produce, minimally, the semantic type of the expected answer. The search component 206 can formulate queries from the output of the question analysis component 204 and may consult various resources such as the internet or one or more knowledge resources, e.g., databases, corpora 208, to retrieve documents, passages, web pages, database rows, database tuples, etc., that are relevant to answering the question. For example, as shown in FIG. 2, in certain embodiments, the search component 206 can consult a corpus of information 208 on a host device 225. The candidate answer generation component 210 can then extract from the search results potential (candidate) answers to the question, which can then be scored and ranked by the answer selection component 212 which may produce a final ranked list of answers with associated confidence measure values.

The various components of the exemplary high level logical architecture for a QA system described above may be used to implement various aspects of the present disclosure. For example, the question analysis component 204 could, in certain embodiments, be used to process a natural language question and determine one or more credibility factors. Further, the search component 206 can, in certain embodiments, be used to perform a search of a corpus of information 208 for a set of search results that are related to an answer to an input question to the QA system. The candidate generation component 210 can be used to establish a relevance relationship between source information of a first search result of the set of search results and the one or more credibility factors of the results of the search component 206. Further, the answer selection component 212 can, in certain embodiments, be used to compute a credibility score for the first search result of the set of search results based on the relevance relationship between the at least one credibility factor and the source feature of the set of search results.

Figure 3:
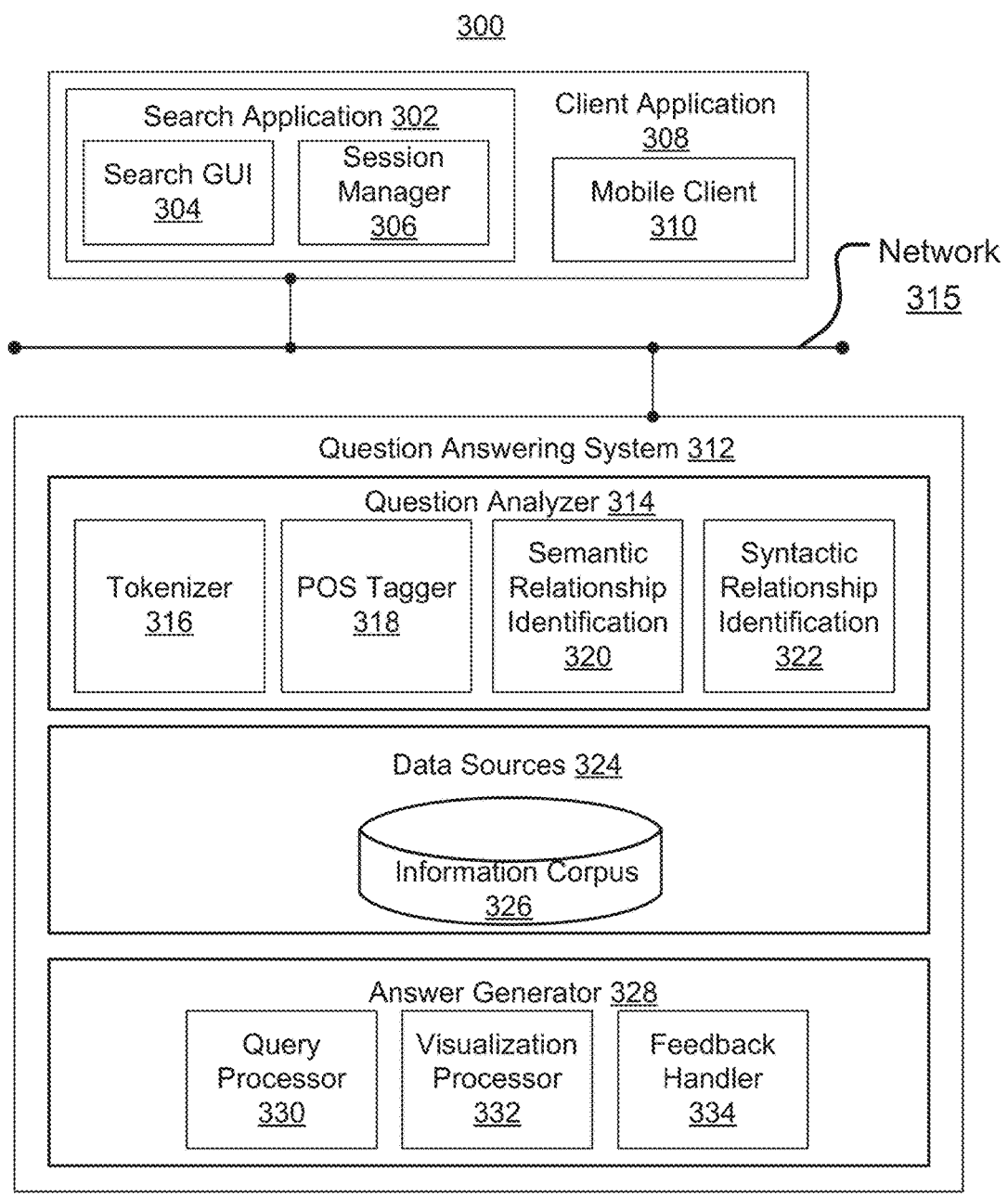
FIG. 3 is a block diagram illustrating a question answering system to generate answers to one or more input questions, according to embodiments.

FIG. 3 is a block diagram illustrating a question answering system (also referred to herein as a QA system) to generate answers to one or more input questions, consistent with various embodiments of the present disclosure. Aspects of FIG. 3 are directed toward an exemplary system architecture 300 of a question answering system 312 to generate answers to queries (e.g., input questions). In certain embodiments, one or more users may send requests for information to QA system 312 using a remote device (such as remote devices 102, 112 of FIG. 1). QA system 312 can perform methods and techniques for responding to the requests sent by one or more client applications 308. Client applications 308 may involve one or more entities operable to generate events dispatched to QA system 312 via network 315. In certain embodiments, the events received at QA system 312 may correspond to input questions received from users, where the input questions may be expressed in a free form and in natural language.

A question (similarly referred to herein as a query) may be one or more words that form a search term or request for data, information or knowledge. A question may be expressed in the form of one or more keywords. Questions may include various selection criteria and search terms. A question may be composed of complex linguistic features, not only keywords. However, keyword-based search for answer is also possible. In certain embodiments, using unrestricted syntax for questions posed by users is enabled. The use of restricted syntax results in a variety of alternative expressions for users to better state their needs.

Consistent with various embodiments, client applications 308 can include one or more components such as a search application 302 and a mobile client 310. Client applications 308 can operate on a variety of devices. Such devices include, but are not limited to, mobile and handheld devices, such as laptops, mobile phones, personal or enterprise digital assistants, and the like; personal computers, servers, or other computer systems that access the services and functionality provided by QA system 312. For example, mobile client 310 may be an application installed on a mobile or other handheld device. In certain embodiments, mobile client 310 may dispatch query requests to QA system 312.

Consistent with various embodiments, search application 302 can dispatch requests for information to QA system 312. In certain embodiments, search application 302 can be a client application to QA system 312. In certain embodiments, search application 302 can send requests for answers to QA system 312. Search application 302 may be installed on a personal computer, a server or other computer system. In certain embodiments, search application 302 can include a search graphical user interface (GUI) 304 and session manager 306. Users may enter questions in search GUI 304. In certain embodiments, search GUI 304 may be a search box or other GUI component, the content of which represents a question to be submitted to QA system 312. Users may authenticate to QA system 312 via session manager 306. In certain embodiments, session manager 306 keeps track of user activity across sessions of interaction with the QA system 312. Session manager 306 may keep track of what questions are submitted within the lifecycle of a session of a user. For example, session manager 306 may retain a succession of questions posed by a user during a session. In certain embodiments, answers produced by QA system 312 in response to questions posed throughout the course of a user session may also be retained. Information for sessions managed by session manager 306 may be shared between computer systems and devices.

In certain embodiments, client applications 308 and QA system 312 can be communicatively coupled through network 315, e.g. the Internet, intranet, or other public or private computer network. In certain embodiments, QA system 312 and client applications 308 may communicate by using Hypertext Transfer Protocol (HTTP) or Representational State Transfer (REST) calls. In certain embodiments, QA system 312 may reside on a server node. Client applications 308 may establish server-client communication with QA system 312 or vice versa. In certain embodiments, the network 315 can be implemented within a cloud computing environment, or using one or more cloud computing services. Consistent with various embodiments, a cloud computing environment can include a network-based, distributed data processing system that provides one or more cloud computing services.

Consistent with various embodiments, QA system 312 may respond to the requests for information sent by client applications 308, e.g., posed questions by users. QA system 312 can generate answers to the received questions. In certain embodiments, QA system 312 may include a question analyzer 314, data sources 324, and answer generator 328. Question analyzer 314 can be a computer module that analyzes the received questions. In certain embodiments, question analyzer 314 can perform various methods and techniques for analyzing the questions syntactically and semantically. In certain embodiments, question analyzer 314 can parse received questions. Question analyzer 314 may include various modules to perform analyses of received questions. For example, computer modules that question analyzer 314 may encompass include, but are not limited to a tokenizer 316, part-of-speech (POS) tagger 318, semantic relationship identification 320, and syntactic relationship identification 322. In certain embodiments, the question analyzer 314 can include using a natural language processing technique.

Consistent with various embodiments, tokenizer 316 may be a computer module that performs lexical analysis. Tokenizer 316 can convert a sequence of characters into a sequence of tokens. Tokens may be string of characters typed by a user and categorized as a meaningful symbol. Further, in certain embodiments, tokenizer 316 can identify word boundaries in an input question and break the question or any text into its component parts such as words, multi-word tokens, numbers, and punctuation marks. In certain embodiments, tokenizer 316 can receive a string of characters, identify the lexemes in the string, and categorize them into tokens.

Consistent with various embodiments, POS tagger 318 can be a computer module that marks up a word in a text to correspond to a particular part of speech. POS tagger 318 can read a question or other text in natural language and assign a part of speech to each word or other token. POS tagger 318 can determine the part of speech to which a word corresponds based on the definition of the word and the context of the word. The context of a word may be based on its relationship with adjacent and related words in a phrase, sentence, question, or paragraph. In certain embodiments, context of a word may be dependent on one or more previously posed questions. Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs (e.g., when, where, why, whence, whereby, wherein, whereupon), conjunctions, determiners, negative particles, possessive markers, prepositions, wh-pronouns (e.g., who, whom, what, which, whose), and the like. In certain embodiments, POS tagger 316 can tag or otherwise annotate tokens of a question with part of speech categories. In certain embodiments, POS tagger 316 can tag tokens or words of a question to be parsed by QA system 312.

Consistent with various embodiments, semantic relationship identification 320 may be a computer module that can identify semantic relationships of recognized identifiers in questions posed by users. For example, the semantic relationship identification 320 may include identifying recognized identifiers such as location names, book titles, company names, academic disciplines, personal names, organizations, institutions, corporations, and other entities. In certain embodiments, semantic relationship identification 320 may determine functional dependencies between entities, the dimension associated to a member, and other semantic relationships.

Consistent with various embodiments, syntactic relationship identification 322 may be a computer module that can identify syntactic relationships in a question composed of tokens posed by users to QA system 312. Syntactic relationship identification 322 can determine the grammatical structure of sentences, for example, which groups of words are associated as "phrases" and which word is the subject or object of a verb. In certain embodiments, syntactic relationship identification 322 can conform to a formal grammar.

In certain embodiments, question analyzer 314 may be a computer module that can parse a received query and generate a corresponding data structure of the query. For example, in response to receiving a question at QA system 312, question analyzer 314 can output the parsed question as a data structure. In certain embodiments, the parsed question may be represented in the form of a parse tree or other graph structure. To generate the parsed question, question analyzer 130 may trigger computer modules 132-144. Question analyzer 130 can use functionality provided by computer modules 316-322 individually or in combination. Additionally, in certain embodiments, question analyzer 130 may use external computer systems for dedicated tasks that are part of the question parsing process.

Consistent with various embodiments, the output of question analyzer 314 can be used by QA system 312 to perform a search of one or more data sources 324 to retrieve information to answer a question posed by a user. In certain embodiments, data sources 324 may include data warehouses, information corpora, data models, and document repositories. In certain embodiments, the data source 324 can be an information corpus 326. The information corpus 326 can enable data storage and retrieval. In certain embodiments, the information corpus 326 may be a storage mechanism that houses a standardized, consistent, clean and integrated form of data. The data may be sourced from various operational systems. Data stored in the information corpus 326 may be structured in a way to specifically address reporting and analytic requirements. In one embodiment, the information corpus may be a relational database. In some example embodiments, data sources 324 may include one or more document repositories.

In certain embodiments, answer generator 328 may be a computer module that generates answers to posed questions. Examples of answers generated by answer generator 328 may include, but are not limited to, answers in the form of natural language sentences; reports, charts, or other analytic representation; raw data; web pages, and the like.

Consistent with various embodiments, answer generator 328 may include query processor 330, visualization processor 332 and feedback handler 334. When information in a data source 324 matching a parsed question is located, a technical query associated with the pattern can be executed by query processor 330. Based on retrieved data by a technical query executed by query processor 330, visualization processor 332 can render visualization of the retrieved data, where the visualization represents the answer. In certain embodiments, visualization processor 332 may render various analytics to represent the answer including, but not limited to, images, charts, tables, dashboards, maps, and the like. In certain embodiments, visualization processor 332 can present the answer to the user in understandable form.

In certain embodiments, feedback handler 334 can be a computer module that processes feedback from users on answers generated by answer generator 328. In certain embodiments, users may be engaged in dialog with the QA system 312 to evaluate the relevance of received answers. Answer generator 328 may produce a list of answers corresponding to a question submitted by a user. The user may rank each answer according to its relevance to the question. In certain embodiments, the feedback of users on generated answers may be used for future question answering sessions.

The various components of the exemplary question answering system described above may be used to implement various aspects of the present disclosure. For example, the client application 308 could be used to receive a question from a user. The question analyzer 314 could, in certain embodiments, be used to determine one or more credibility factors. Further, the question answering system 312 could, in certain embodiments, be used to perform a search of an information corpus 326 for a set of search results that are related to an answer to an input question to the question answering system. The answer generator 328 can be used to establish a relevance relationship between source information of a first search result of the set of search results and the credibility factors, based on the results of the search performed by the question answering system 312. Further, the visualization processor 332 can, in certain embodiments, be used to compute a credibility score for a first search result of the set of search results based on the relevance relationship between the credibility factor and the source information of the set of search results. The visualization processor 332 can further determine and select a subset of the set of search results to provide in a display area.

Figure 4:
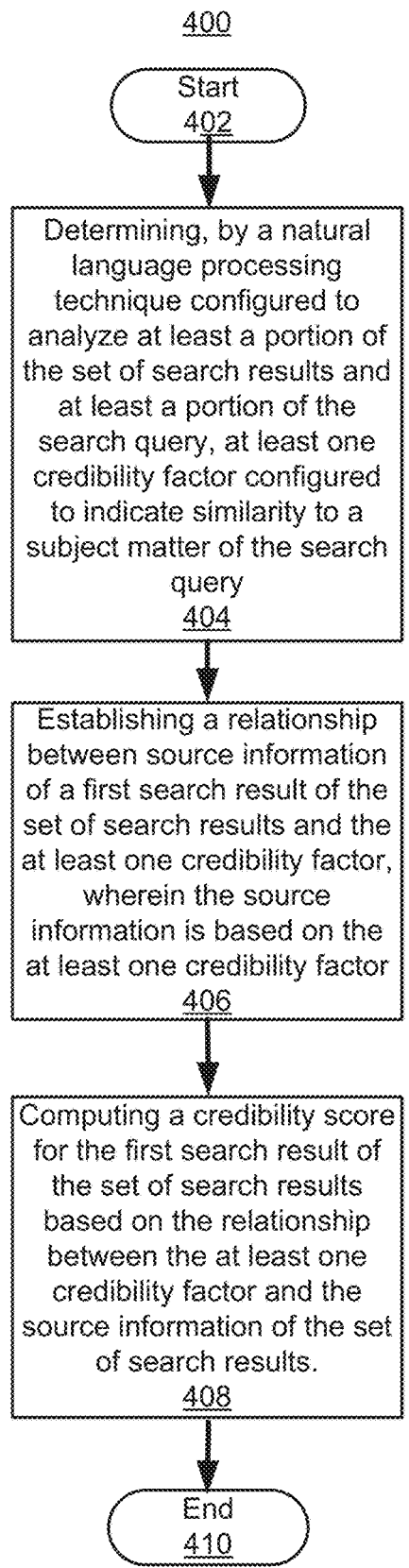
FIG. 4 is a flowchart illustrating a method for managing credibility of a set of search results in a question answering system, according to embodiments.

FIG. 4 is a flowchart illustrating a method 400 for managing credibility of a set of search results in a question answering system, according to embodiments of the present disclosure. Aspects of FIG. 4 are directed toward computing a credibility score for a set of search results based on a relevance relationship between a credibility factor and source information of the set of search results. The method 400 may begin at block 402 and end at block 410. Consistent with various embodiments, the method 400 may include a determining block 404, an establishing block 406, and a computing block 408.

Consistent with various embodiments of the present disclosure, at block 404, the method 400 may include determining, by a natural language processing technique configured to analyze at least a portion of a set of search results and at least a portion of a search query, at least one credibility factor configured to indicate similarity to a subject matter of the search query. The search query may be an input question submitted to a search engine by a user. As an example, the search question may be "What is the best time of year to visit Brazil?" Consistent with various embodiments, a set of search results may be returned by the search engine in response to the search question. The search results may include a number of documents, images, videos, blogs, articles, and other forms of content related to the search question. For example, the search results may include travel guides containing articles about sightseeing locations in Brazil, tourism sites with lists of different activities for each season, and weather sites with aggregate climate data for different areas of Brazil throughout the year.

Consistent with various embodiments, at block 404 the method 400 can include determining at least one credibility factor for the search query and the set of search results. In certain embodiments, the credibility factor may be an aspect of the search query and the set of search results that can be used to evaluate the reliability of the set of search results. The credibility factor may be identified based on both the search query as well as the search results. As described herein, multiple credibility factors may be determined for a given search and set of search results. The credibility factor may be determined based upon a relevance to a subject matter of the search query. In certain embodiments, the credibility feature may be one or more of an origin location feature, a chronology feature, or a milestone feature. As an example, for the search question of "What is the best time of year to visit Brazil?" the subject matter may be determined to be "Travel-Brazil." More specifically, the natural language processing technique may determine the subject matter of "Travel-Brazil" by parsing the search question and recognizing the word "Brazil" as a country name, and the term "visit" as indicating travel or tourism (consistent with embodiments that follow herein.)

The credibility factor may then be determined to be a feature or aspect that can be used as a basis to evaluate the reliability of search results related to the subject matter of "Travel-Brazil" (e.g., travel guides containing articles about sightseeing locations in Brazil, tourism sites with lists of different activities for each season, and weather sites with aggregate climate data for different areas of Brazil throughout the year). For example, a credibility factor of "origin location" may be determined for the subject matter of "Travel-Brazil." The credibility factor may be determined by the natural language processing technique to be "origin location" based on the presence of a specific location (e.g., Brazil) in the subject matter. Put differently, the origin location of each search result of the set of search results can be used to determine the credibility of the search results (e.g., search results originating from Brazil or written by Brazilians living elsewhere may be deemed more credible than other search results). As an additional example, consider that a search question of "What are the most important developments in the field of physics?" was entered into a search engine. The subject matter may be determined to be "Science-Physics" and the credibility factor may be determined to be "milestones." The natural language processing technique may determine the subject matter to be "Science-Physics" in response to parsing the search question and identifying that the term "physics" is being used in reference to the scientific discipline. Similarly, the credibility factor may be determined by the natural language processing technique to be "milestones" in response to parsing the search question and recognizing that the phrase "most important developments in the field" is referring to historic or groundbreaking events within the discipline of physics. Accordingly, milestones (e.g., significant developments or discoveries) in the field of physics could be used as a basis to evaluate the credibility of the set of search results returned in response to the search query. The set of search results may, as an example, include timelines labeled with physics breakthroughs and discoveries, historical summaries of the development of physics, scientific journal articles, and biographies of seminal physicists.

Consistent with various embodiments, the credibility factor(s) may be determined by a natural language processing technique configured to analyze a portion of the set of search results and at least a portion of the search query. In certain embodiments, the natural language processing technique may be a software tool, widget, or other program configured to determine the credibility factor(s) of the set of search results and the portion of the search query. More particularly, the natural language processing technique can be configured to parse a semantic feature and a syntactic feature of the portion of the set of search results and the portion of the search query. The natural language processing technique can be configured to recognize keywords, contextual information, and metadata tags associated with the set of search results and the search query. In certain embodiments, the natural language processing technique can be configured to analyze summary information, keywords, figure captions, and text descriptions included in the search results, and use syntactic and semantic elements present in this information to determine the credibility feature. The syntactic and semantic elements can include information such as word frequency, word meanings, text font, italics, hyperlinks, proper names, noun phrases, parts-of-speech, and the context of surrounding words. Other syntactic and semantic elements are also possible. Based on the analyzed metadata, contextual information, syntactic and semantic elements, and other data, the natural language processing technique can be configured to determine a property (e.g., the credibility feature) on which to base the credibility of a given search result. In certain embodiments, the natural language processing technique may be configured to select an applicable credibility factor from a predetermined list (e.g., origin location, chronology feature, or milestone).

Consistent with various embodiments, at block 406 the method 400 can include establishing a relevance relationship between source information of a first search result of the set of search results and the at least one credibility factor, wherein the source information is based on the at least one credibility factor. In certain embodiments, the source information may be one or more features of a search result that is related to the credibility factor determined for a given search query and search results. For instance, consider the example described above, wherein the search query was "What is the best time of year to visit Brazil?" and the credibility factor was determined to be origin location. In certain embodiments, source information including the author of each search result may be identified. Accordingly, at block 406 the method 400 can include establishing a relevance relationship between the author of a search result and the origin location of the search result. Establishing the relevance relationship may include evaluating the relevance of the source information with respect to the credibility factor. For example, consistent with the present example, establishing the relevance relationship may include ascertaining whether or not the author of the search result is originally from or near Brazil (e.g., an author originally from or near Brazil may have knowledge regarding the best time of the year to visit Brazil.).

In certain embodiments, establishing the relevance relationship between source information of the search results and the credibility factor(s) further comprises comparing metadata associated with the source information to metadata coupled with the subject matter of the query. Metadata may include summary information, keywords, figure captions, images, syntactic and semantic elements, and other types of data. According to the example described herein, metadata associated with the author (e.g., cultural background, first language, expertise, etc.) of a particular search result may be compared with the subject matter of "Travel-Brazil" to establish the relevance relationship between the credibility factor and the source information. For instance, an author who lives in Brazil and works at a travel agency may be identified as particularly relevant with respect to the credibility factor and source information.

Consistent with various embodiments, at block 406 the method 400 can include computing a credibility score for the first search result of the set of search results based on the relevance relationship between the at least one credibility factor and the source information of the set of search results. For example, in certain embodiments, the credibility score may be an integer value between 1 and 100, where greater values indicate that a search result has a substantially high level of credibility, while lesser values indicate a lower level of credibility. Other systems of indicating the credibility score are also possible. In certain embodiments, computing the credibility score may be based on the relevance relationship between the credibility factor and the source information. For example, in situations where the source information is substantially relevant to the credibility factor, the search result containing the source information may be assigned a relatively greater credibility score. For example, according to the example discussed above, for a search question of "What is the best time of year to visit Brazil?" an article written by a Brazilian author working for a travel agency may be awarded a credibility score of 89, while an article written by a farmer in Iowa may be awarded a credibility score of 16.

Consistent with various embodiments, the credibility scores may be computed by a credibility algorithm configured to process source information and metadata associated with the search results. The credibility algorithm may be configured to access a statistical credibility model stored on a rules database, and generate the credibility scores based on established parameters of the statistical credibility model. In certain embodiments, the credibility algorithm may calculate the credibility scores based on the personal business sector of the author. For instance, consider the example cited above, in which the article written by the Brazilian author working for the travel agency received a credibility score of 89, while the farmer in Iowa received a credibility score of 16. The statistical credibility module may indicate that, statistically, individuals of Brazilian descent and individuals working at travel agencies have a significant likelihood of having knowledge regarding travel in Brazil. The credibility algorithm may weight these factors, and determine that an individual that is both of Brazilian descent and working at a travel agency has a high likelihood of being knowledgeable about Brazilian travel, and compute the credibility score of 89. Similarly, the statistical credibility model may indicate that, as soybean production is a relatively large industry in both Iowa and Brazil, farmers in Iowa may have some knowledge about Brazil (e.g., through shared industry contacts, media, business trips to observe soybean production techniques in Brazil). The credibility algorithm may weight these factors and determine that probabilistically, a farmer in Iowa may have some level of knowledge about Brazilian travel, and compute a credibility factor of 16 for the article written by the farmer in Iowa.

Figure 5:
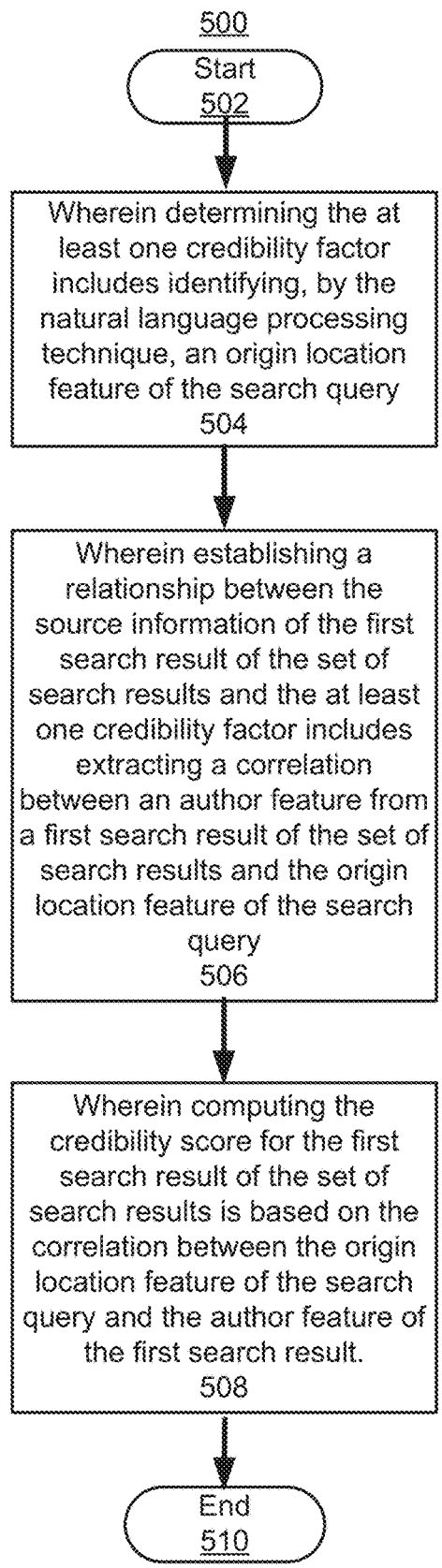
FIG. 5 is a flowchart illustrating a method for managing credibility of a set of search results based on an origin location feature and an author feature, according to embodiments.

FIG. 5 is a flowchart illustrating a method 500 for managing credibility of a set of search results based on an origin location feature and an author feature, according to embodiments of the present disclosure. In certain embodiments, elements of the method 500 may correspond with elements of the method 400 of FIG. 4. Aspects of FIG. 5 are directed toward computing a credibility score for set of search results based on a relevance relationship between an origin location feature of a search query and an author feature of a search result. The method 500 may begin at block 502 and end at block 510. Consistent with various embodiments, the method 500 may include an identifying block 504, an extracting block 506, and a computing block 508.

Consistent with embodiments of the present disclosure, at block 504 the method 500 can include identifying, by a natural language processing technique, an origin location feature of the search query. In certain embodiments, the identifying block 504 may correspond to determining block 404 of method 400. More particularly, identifying the origin location feature of the search query may correspond with determining a credibility factor; that is, the origin location feature of method 500 may be a credibility factor of method 400. The origin location feature may be a geographic region, area, or country that is referenced in the search query. In certain embodiments, the method 500 may recognize that a culture, language, location, event, food, beverage, person, or other aspect is associated with a particular region, area, or country. As an example, in certain embodiments, a user may enter a search query of "What are the best Japanese books about the Tokugawa period?" into a search engine. Accordingly, the method 500 may identify an origin location feature of "Japan." In certain embodiments, the origin location feature can be identified using a natural language processing technique configured to parse the search query. For example, the natural language processing technique can be configured to recognize proper nouns, location names, parts-of-speech, word meanings, and other semantic and syntactic elements of the search query to identify the origin location feature.

Consistent with various embodiments, at block 506 the method 500 can include extracting a correlation between an author feature from a first search result of the set of search results and the origin location feature of the search query. In certain embodiments, the extracting block 506 may correspond to establishing block 406 of method 400. More particularly, extracting the correlation between the author feature and the origin location feature may correspond with establishing the relevance relationship between the credibility factor and the source information. In certain embodiments, the author feature may be one or more aspects associated with the creator or originator of a search result that may be considered when evaluating its credibility. As an example, the author feature may include a nationality, a cultural expertise, a subject area expertise, or a first language. Other types of author feature are also possible.

Consistent with various embodiments of the present disclosure, extracting the correlation between the author feature of the first search result and the origin location feature of the search query may include comparing metadata associated with the author feature to metadata associated with the origin location feature to evaluate the relevance between the author feature and the origin location feature. For instance, once again consider the example search query of "What are the best Japanese books about the Tokugawa period?" The search results may include an article on the topic of highly regarded Japanese books. Further, the method 500 may identify, based on an author biography appended to the search result, that the author of the search result is a book critic with a doctorate degree in Japanese history. Additionally, the method 500 may analyze the article to determine a first language of the author based on characteristics of language use present in the article. As an example, the method 500 may determine, based on usage of the articles "a" and "the" (linguistic features that are not present in the Japanese language) that the first language of the author is Japanese. Accordingly, these factors could be considered when determining the relative credibility of the search result.

Consistent with various embodiments, at block 508 the method 500 can include computing a credibility score for a search result of the set of search results based on the correlation between the origin location feature of the search query and the author feature of the first search result. Computing the credibility score for the search result may include evaluating the relevance of the author feature to the origin location feature. In certain embodiments, evaluating the relevance of the author feature with the origin location feature may include using a natural language processing technique to weight various search results differently based on metadata associated with the search results and the search query. Once again consider the example search query above of "What are the best Japanese books about the Tokugawa period?" As described herein, one search result may be an article written by a book critic with a doctorate degree in Japanese history whose first language is Japanese. The search results may also include a journal article written by a history professor who has cited one or more Japanese books related to the Tokugawa period. In certain embodiments, the method 500 may evaluate both search results with respect to the search query and determine that, as the original search query requested the "best Japanese books about the Tokugawa period," that the article by the book critic is substantially more relevant to the original search query. Accordingly, the article by the book critic may be assigned a credibility score of 94, while the journal article written by the history professor may be assigned a credibility score of 81. As described above, the credibility scores may be determined by a credibility algorithm configured to access a statistical credibility module and compute the credibility scores based on an academic background and cultural background of the author.

Figure 6:
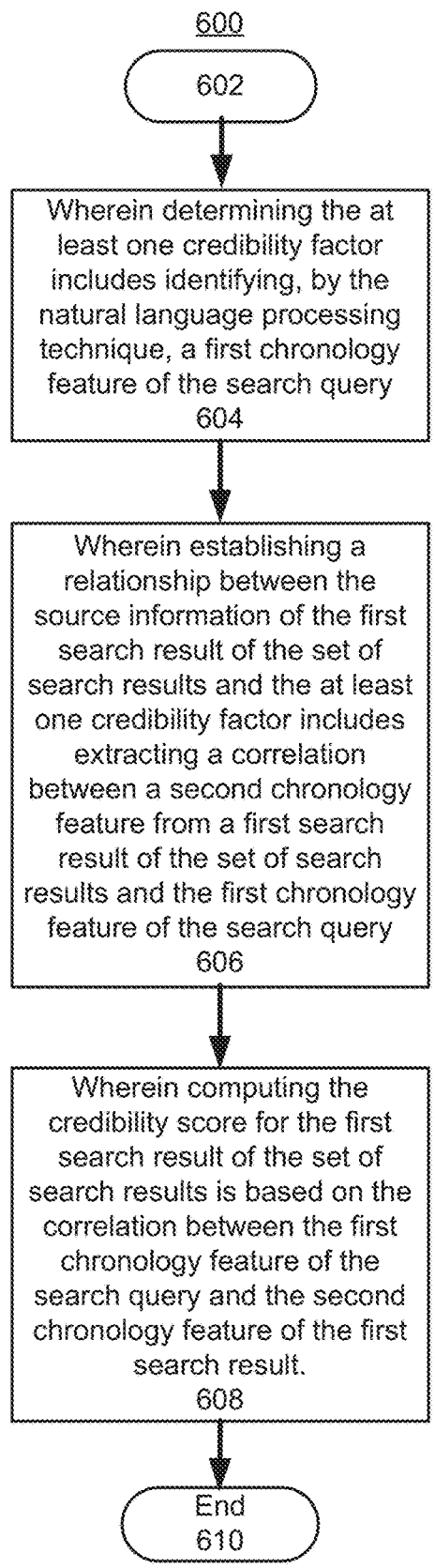
FIG. 6 is a flowchart illustrating a method for managing credibility of a set of search results based on a first chronology feature and a second chronology feature, according to embodiments.

FIG. 6 is a flowchart illustrating a method 600 for managing credibility of a set of search results based on a first chronology feature and a second chronology feature, according to embodiments of the present disclosure. In certain embodiments, elements of the method 600 may correspond with elements of the method 400 of FIG. 4. Aspects of FIG. 6 are directed toward computing a credibility score for set of search results based on a relevance relationship between a first chronology feature of a search query and a second chronology feature of a search result. The method 600 may begin at block 602 and end at block 610. Consistent with various embodiments, the method 600 may include an identifying block 604, an extracting block 606, and a computing block 608.

Consistent with embodiments of the present disclosure, at block 604 the method 600 can include identifying, by a natural language processing technique, a first chronology feature of the search query. In certain embodiments, the identifying block 504 may correspond to determining block 404 of method 400. More particularly, identifying the first chronology feature of the search query may correspond with determining a credibility factor; that is, the first chronology feature of method 600 may be a credibility factor of method 400. The first location feature may, for example, be a date, a version number (e.g., a software version number or hardware iteration number), a year, a time period, or other temporal characteristic that is referenced in the search query. In certain embodiments, the method 600 may recognize that a particular product, hardware model, software application, product manual, event, computer driver or other aspect is associated with a version number, date, or other temporal characteristic. In certain embodiments, the first chronology feature can be identified using a natural language processing technique configured to parse the search query. For example, the natural language processing technique can be configured to recognize proper nouns, hardware model lines, software application names, parts-of-speech, word meanings, and other semantic and syntactic elements of the search query to identify the first chronology feature. Additionally, in certain embodiments, the natural language processing technique may recognize one or more words (e.g., recent, later, after, before) as related to a specific or general period of time. As an example, in certain embodiments, a user may enter a search query of "Most recent ACME Middleware manual?" into a search engine. Accordingly, the method 600 may identify a first chronology feature of "Product Manual-Latest Version" for the ACME Middleware enterprise software.

Consistent with various embodiments, at block 606 the method 600 can include extracting a correlation between the second chronology feature from the first search result of the set of search results and the first chronology feature of the search query. In certain embodiments, the extracting block 606 may correspond to establishing block 406 of method 400. More particularly, extracting the correlation between the first chronology feature and the second chronology feature may correspond with establishing the relevance relationship between the credibility factor and the source information. In certain embodiments, the second chronology feature may be one or more aspects associated with a time, date, version number, accumulated preparation temporal value, or other temporal characteristic of a search result that may be considered when evaluating its credibility. The accumulated preparation temporal value may be an integer value indicating a duration of time spent creating the search result (e.g., a research paper that look 2 years to write, etc.) As an example, the second chronology feature may include a version number of a software program or a product manual, or a model number of a hardware component. Other types of second chronology features are also possible.

Consistent with various embodiments of the present disclosure, extracting the correlation between the second chronology feature of the first search result and the first chronology feature of the search query may include determining whether a recency score of the second chronology feature is within a recency range associated with the first chronology feature. In certain embodiments, the recency score may be an integer value between 1 and 100 computed based on a length of time that has elapsed between an origin date of the second chronology feature of the first search result and the date and time at which the search query was processed by the search engine. The origin date of the second chronology feature may, for instance, be a publication date of a software or product manual version, a release date of a hardware model, or other feature associated with a temporal characteristic.

In certain embodiments, lesser recency scores may indicate that the origin date of the second chronology feature of the search result is substantially old, while greater recency scores may indicate the origin date of the second chronology feature of the search result is more recent (e.g., closer to the time at which the search query was processed by the search engine.) For example, a recency score of 1 may indicate that the origin date of the second chronology feature of a search result is relatively old with respect to the first chronology feature, while a recency score of 100 may indicate that the origin date of the second chronology feature is relatively recent with respect to the first chronology feature. The recency range may be a range of recency scores determined based on the first chronology feature, and may represent a "tolerance range" of recency scores. In certain embodiments, the recency range may be automatically determined based on the subject field of the first chronology feature (e.g., as science and technology is a rapidly advancing field, the recency range may be narrow.) For example, in certain embodiments, the recency range for a first chronology feature of "Product Manual-Latest Version" may be 80-100.

As an example, once again consider the example search query of "Most recent ACME Middleware product manual?" The search results may include a link to a manual for ACME Middleware 8.0 that was published one week prior to the time the search query was processed by the search engine. Accordingly, in certain embodiments, a natural language processing technique configured to parse the search result may identify that the publication date of the ACME Middleware 8.0 product manual was a week before the search query was received and processed by the search engine. Accordingly, the search result including the ACME Middleware 8.0 product manual may be assigned a recency score of 86.

Consistent with various embodiments, at block 608 the method 600 can include computing a credibility score for a search result of the set of search results based on the correlation between the first chronology feature of the search query and the second chronology feature of the first search result. Computing the credibility score for the search result may include evaluating the recency score of the first search result with respect to the recency range. In certain embodiments, search results with a recency score closer to the upper value of the recency range may be assigned a greater credibility value. Once again consider the example search query above of "Most recent ACME Middleware product manual?" having a recency range of 80-100. As described herein, one search result may be an ACME Middleware product manual published one week before the search was performed, and having a recency score of 86. The search results may also include an ACME Middleware 7.0 product manual that was published one month before the search was performed, having a recency score of 81. Accordingly, in certain embodiments, the method 600 may evaluate both search results and determine that, as the original search query requested the "most recent ACME Middleware product manual," that the ACME Middleware 8.0 product manual (e.g., the search result with the recency score closest to the upper value of the recency range) is the best match for the search query. Accordingly, in certain embodiments, the search result containing the ACME Middleware 8.0 product manual may be assigned a credibility score of 91, while the search result containing the ACME Middleware 7.0 product manual may be assigned a credibility score of 79. As described herein, the credibility scores may be calculated by a credibility algorithm configured to access a statistical credibility module and compute the credibility scores based on the recency of the search results.

Figure 7:
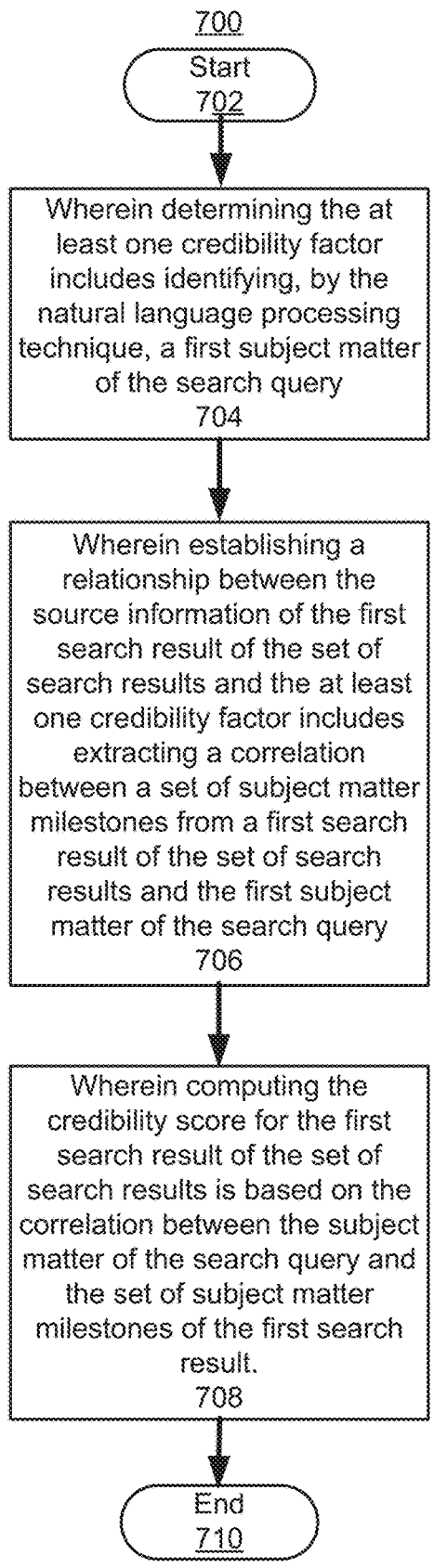
FIG. 7 is a flowchart illustrating a method for managing credibility of a set of search results based on a first subject matter and a set of subject matter milestones, according to embodiments.

FIG. 7 is a flowchart illustrating a method 700 for managing credibility of a set of search results based on a first subject matter and a subject matter milestone, according to embodiments of the present disclosure. In certain embodiments, elements of the method 700 may correspond with elements of the method 400 of FIG. 4. Aspects of FIG. 6 are directed toward computing a credibility score for a set of search results based on a relevance relationship between a first subject matter of a search query and a subject matter milestone of a search result. The method 700 may begin at block 702 and end at block 710. Consistent with various embodiments, the method 700 may include an identifying block 704, an extracting block 706, and a computing block 708.

Consistent with embodiments of the present disclosure, at block 704 the method 700 can include identifying, by a natural language processing technique, a first subject matter of the search query. In certain embodiments, the identifying block 704 may correspond to determining block 704 of method 700. More particularly, identifying the first subject matter of the search query may correspond with determining a credibility factor; that is, the first subject matter of method 700 may be a credibility factor of method 400. The first subject matter may, for example, be a field of study such as history, physics, anthropology, archaeology, or one or more of a number of possible disciplines. In certain embodiments, the method 700 may recognize that a particular topic, keyword, or other feature of the search query is associated with a particular subject matter (e.g., the method 700 may recognize that the term "photoelectric effect" is a phenomena within the field of study of physics). In certain embodiments, the first chronology feature can be identified using a natural language processing technique configured to parse the search query. For example, the natural language processing technique can be configured to recognize proper nouns, theory names, research journals, sub-disciplines, research conventions, parts-of-speech, word meanings, and other semantic and syntactic elements of the search query to identify the first subject matter. As an example, in certain embodiments, a user may enter a search query of "quantum electrodynamics" into a search engine. Accordingly, the method 700 may identify a first subject matter of "Quantum Physics-Electrodynamics" for the search query.

Consistent with various embodiments, at block 706 the method 700 can include extracting a correlation between a subject matter milestone from a first search result of the set of search results and the subject matter of the search query. In certain embodiments, the extracting block 706 may correspond to establishing block 406 of method 400. More particularly, extracting the correlation between the subject matter and the subject matter milestone may correspond with establishing the relevance relationship between the credibility factor and the source information. In certain embodiments, the subject matter milestone may be a significant event in the history of a field or discipline that may be considered when evaluating the credibility of a particular search result. As an example, the subject matter milestone may include a prestigious prize awarded for work related to the particular discipline, a discovery, significant research paper, or other important development. Other types of subject matter milestones are also possible.

Consistent with various embodiments of the present disclosure, extracting the correlation between the set of subject matter milestones of the first search result and the subject matter of the search query may include determining whether a recency score of the set of subject matter milestones is within a recency range associated with the first subject matter. As described elsewhere herein, in certain embodiments, the recency score may be an integer value between 1 and 100 computed based on a length of time that has elapsed between an origin date of the set of subject matter milestones of the first search result and the date and time at which the search query was processed by the search engine. The origin date of the set of subject matter milestones may, for instance, be a publication date of a significant research paper, discovery date, or other feature associated with a temporal characteristic.

In certain embodiments, lesser recency scores may indicate that the origin date of the set of subject matter milestones of the search result is substantially old, while greater recency scores may indicate the origin date of the set of subject matter milestones of the search result is more recent (e.g., closer to the time at which the search query was processed by the search engine.) For example, a recency score of 1 may indicate that the origin date of the set of subject matter milestones of a search result is relatively old with respect to the first subject matter, while a recency score of 100 may indicate that the origin date of the set of subject matter milestones is relatively recent with respect to the first subject matter. The recency range may be a range of recency scores determined based on the subject matter, and may represent a "tolerance range" of recency scores. In certain embodiments, the recency range may be automatically determined based on the subject matter (e.g., as science and technology is a rapidly advancing field, the recency range may be narrow.) For example, in certain embodiments, the recency range for a first subject matter of "Quantum Physics-Electrodynamics" may be 70-100.

As an example, once again consider the example search query of "quantum electrodynamics." The search results may include a link to a review article written by Enrico Fermi that represented an early formalization of quantum electrodynamics. The review article may be identified as a subject matter milestone in the subject matter of physics. In certain embodiments, a natural language processing technique configured to parse the search result may identify that the publication date of the review article was in 1932. Accordingly, the search result including the ACME Middleware 8.0 product manual may be assigned a recency score of 49.

Figure 8:
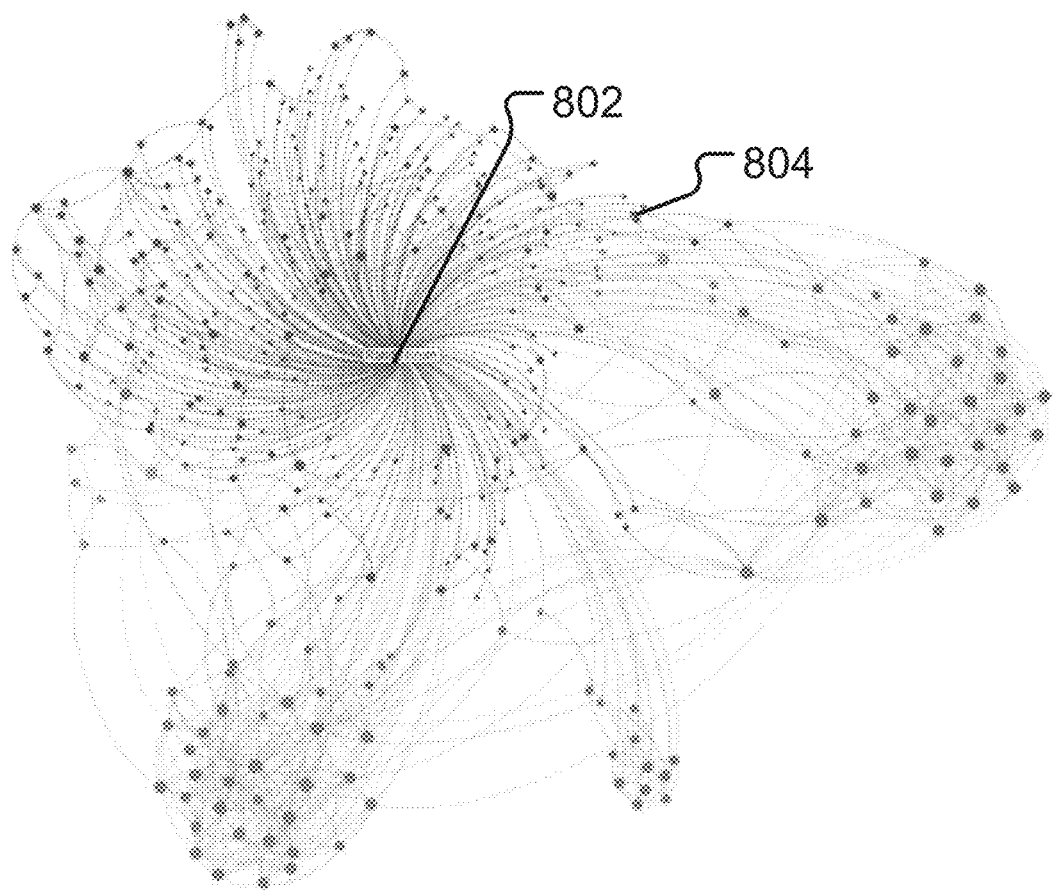
FIG. 8 illustrates an example cluster graph representing a set of subject matter milestones for a first subject matter, according to embodiments.

Aspects of the present disclosure, in certain embodiments, are directed toward generating a cluster graph to represent the first subject matter and the set of subject matter milestones. FIG. 8 illustrates an example cluster graph 800 representing a set of subject matter milestones for a first subject matter. Point 802, at the center of the spiral, may represent the first subject matter. Each point of the cluster graph, such as point 804, may represent a subject matter milestone of the subject matter. The distance between each point may be based on the recency score of each subject matter milestone.

Returning to FIG. 7, at block 708 the method 700 can include computing a credibility score for a search result of the set of search results based on the correlation between the first subject matter of the search query and the subject matter milestone of the first search result. Computing the credibility score for the search result may include evaluating the recency score of the first search result with respect to the recency range. In certain embodiments, search results with a recency score closer to the upper value of the recency range may be assigned a greater credibility value. Once again consider the example search query above of "quantum electrodynamics" having a recency range of 70-100. As described herein, one search result may include a link to a review article written by Enrico Fermi in 1932 that represented an early formalization of quantum electrodynamics, having a recency score of 49. The search results may also include a link to the announcement of a prestigious prize in 1965 in physics for work in quantum electrodynamics, having a recency score of 66. Accordingly, in certain embodiments, the method 700 may evaluate both search results and determine that, as the 1965 prize announcement is more recent, (e.g., the search result with the recency score closest to the upper value of the recency range) it is the best match for the search query. Accordingly, in certain embodiments, the search result including the 1932 review article by Enrico Fermi may be assigned a credibility score of 68, while the search result including the prestigious prize announcement in 1965 may be assigned a credibility score of 83.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed wherein.

What is claimed is:

1. A system for managing credibility of a set of computer-generated search results for a user-input search query in an automated question answering system, the system comprising:
   a determining module configured to determine, using a natural language processing technique configured to analyze at least a portion of the set of computer-generated search results and at least a portion of the user-input search query, at least one credibility factor configured to indicate similarity to a subject matter of the user-input search query, wherein determining the at least one credibility factor includes:
      identifying, by the natural language processing technique, an origin location feature of the user-input search query, a first chronology feature of the user-input search query, and a first subject matter of the user-input search query;
   a parsing module configured to parse the portion of the set of computer-generated search results and the user-input search query to determine a semantic feature, wherein the semantic feature is at least in part associated with word meaning, wherein the parsing module parses the portion of the set of computer-generated search results and the user-input search query to determine a syntactic feature, wherein the syntactic feature is at least in part associated with part-of-speech;
   an establishing module configured to establish a relevance relationship between the at least one credibility factor and source information of a first search result of the set of computer-generated search results, wherein the source information is based on the at least one credibility factor, and wherein establishing the relevance relationship includes:
      comparing metadata coupled with the source information to metadata coupled with the subject matter of the user-input search query;
      extracting a correlation between an author feature from the first search result of the set of computer-generated search results and the origin location feature of the user-input search query, wherein the author feature includes one or more of a nationality, a cultural background, a subject area expertise, or a first language;
      extracting a correlation between a chronology feature from the first search result of the set of computer-generated search results and the first chronology feature of the user-input search query, wherein the first chronology feature of the user-input search query includes one of a date, a version number, or an accumulated preparation temporal value, and wherein extracting the correlation between the first chronology feature of the user-input search query and the second chronology feature of the first search result includes determining that a recency score of the second chronology feature is within a recency range associated with the first chronology feature;
      extracting a correlation between a set of subject matter milestones from the first search result of the set of computer-generated search results and the first subject matter of the user-input search query, wherein extracting the correlation between the set of subject matter milestones from the first search result of the set of computer-generated search results and the first subject matter of the user-input search query comprises determining that a recency score of the set of subject matter milestones is within a recency score of the set of subject matter milestones and the set of subject matter milestones of the first search result;
   a computing module configured to compute, by a statistical credibility model, a credibility score for the first search result of the set of computer-generated search results based on the relevance relationship between the at least one credibility factor and the source information of the set of computer-generated search results, wherein the statistical credibility model includes probabilistic information for the source information;
   a visualization processor configured to select a subset of the computer-generated search results and further configured to provide the selected subset of the computer-generated search results in a display area; and
   a generating module configured to generate, based on the recency score of the set of subject milestones, a cluster graph to represent the correlation between the subject matter and the set of subject matter milestones.

\* \* \* \* \*